2 Sheets—Sheet 1.

S. F. REYNOLDS.

Assignor of one-half interest to C. S. Trowbridge.

MACHINE FOR TEMPERING SICKLE SECTIONS.

No. 7,563. Reissued March 20, 1877.

WITNESSES
Nat. E. Oliphant
Geo. R. Porter

INVENTOR
Samuel F. Reynolds,
per Chas. H. Fowler
Attorney.

N. PETERS, PHOTO-LITHOGRAPHER, WASHINGTON, D. C.

S. F. REYNOLDS.

Assignor of one-half interest to C. S. Trowbridge.

MACHINE FOR TEMPERING SICKLE SECTIONS.

No. 7,563. Reissued March 20, 1877.

WITNESSES.
Nat. E. Oliphant
Geo. R. Porter

INVENTOR
Samuel F. Reynolds.
Chas. H. Fowler,
Attorney.

N. PETERS, PHOTO-LITHOGRAPHER, WASHINGTON, D. C.

UNITED STATES PATENT OFFICE

SAMUEL F. REYNOLDS, OF AUBURN, NEW YORK, ASSIGNOR OF ONE-HALF INTEREST TO CHAS. S. TROWBRIDGE.

IMPROVEMENT IN MACHINES FOR TEMPERING SICKLE-SECTIONS.

Specification forming part of Letters Patent No. 107,541, dated September 20, 1870; reissue No. 7,563, dated March 20, 1877; application filed June 12, 1876.

*To all whom it may concern:*

Be it known that I, SAMUEL F. REYNOLDS, of Auburn, in the county of Cayuga and State of New York, have invented certain new and useful Improvements in Tempering Sickle-Sections, and other like articles of steel having a double cutting-edge; and I do hereby declare that the following is a full, clear, and exact description of the same, reference being had to the accompanying drawings, forming a part of this specification, in which—

Figure 1:
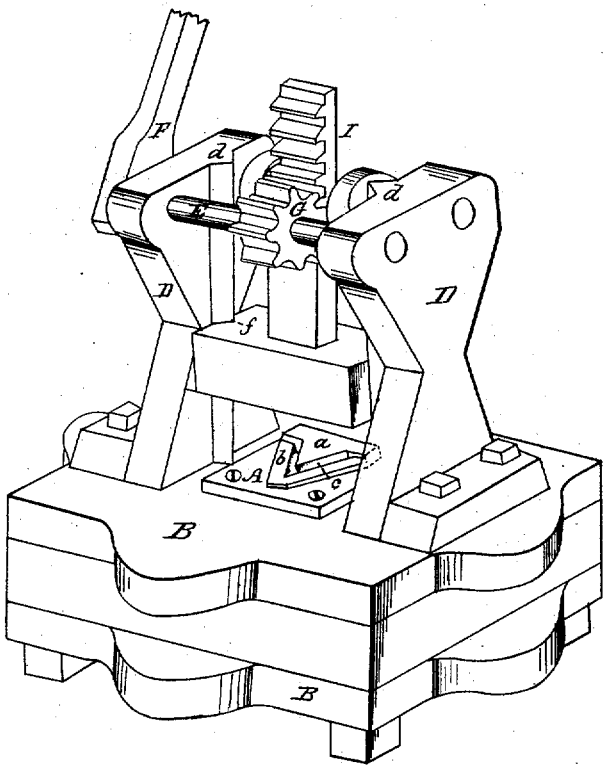
Figure 2:
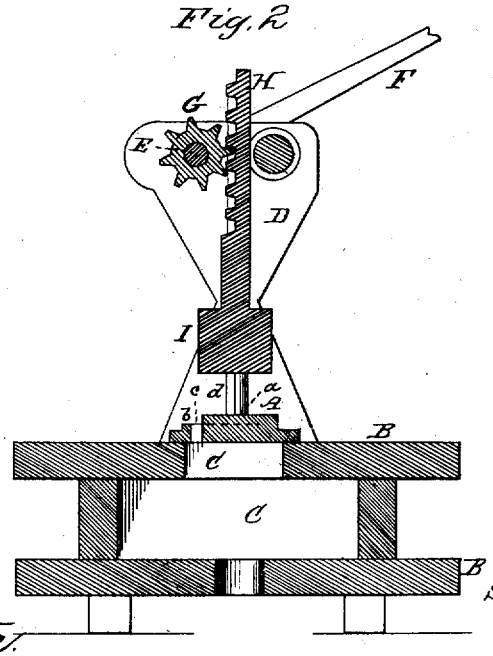
Figure 3:
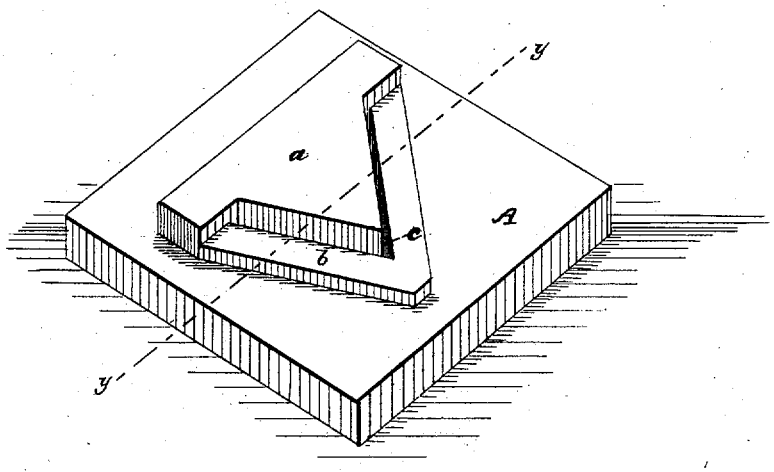
Figure 4:
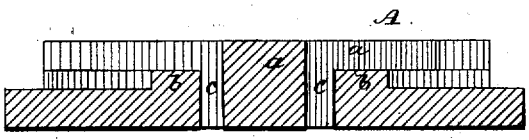
Figure 5:
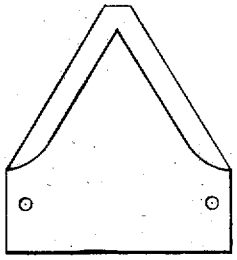

Figure 1 is a perspective view of my improved die or block, showing it connected to a base or bed with a holding device or follower. Fig. 2 is a vertical longitudinal section of the same. Fig. 3 is a perspective view of the die or block on an enlarged scale. Fig. 4 is a vertical longitudinal section of the block or die, taken on line *y y* of Fig. 3; and Fig. 5, a plan view of a sickle-section.

It will be observed that sickle-sections of mowing and reaping machines are tempered only at or near their cutting-edge, the center of the section being left untempered, so as to be less liable to break or fracture. The object and purpose of the present invention therefore is to accomplish this result; and the invention consists in a die or block having an inner protecting-surface, over and upon which the central portion of the article to be tempered rests, and outer openings or passages through said die or block, and leading to the sides of the protecting-surface, for the purpose of allowing the tempering element to come in contact with that portion of the article which projects over said passages or openings, and thereby temper the same, while the central portion of the article is shielded from contact with the tempering element by the protecting-surface.

In the accompanying drawings, A is designed to represent the die or block of the form or shape of the article to be tempered, that shown being intended for the purpose of tempering sickle-sections. The die or block A has a flat surface, *a*, upon which the heel and central portion of a sickle-section, or that portion which is not to be tempered, is placed, and upon which surface said portion lies and is held. On a plane somewhat below this flat surface *a*, and parallel with its sides, is a rib or projection, *b*, and between this projection and the surface *a* there are passages or openings *c*, to expose that portion of the sickle-section that is to form the cutting-edge to the tempering element during the process of tempering, said passages or openings extending through the die or block, and leading to the sides of the flat surface *a*. The latter, which constitutes the shielding or protecting surface, is extended to a plane above the plane of the outlet of the openings or passages, to allow the tempering element, which is guided upon the cutting-edge by the rib or projection *b*, to pass off from between the under side of the section and the top of said rib or projection. That portion of the article to be untempered—as, in this case, the central and heel of the sickle-section—is shielded and protected from the direct contact or action of the tempering element, thereby obtaining a great uniformity of temper where the cutting-edges are to be, and without loss by cracking, breaking, or warping.

A base or bed, B, incloses a water chamber or passage, C, through which a head of water can be allowed to flow, regulated by a stop cock or valve connected to the supply-pipe, or arranged at any suitable place in the column of water; and on this base or bed, and over the water-orifice, is placed the die or block A. On pillar-blocks D D, or in them, is hung a shaft, E, having upon one of its ends a lever or crank, F, by which it may be turned. Upon the shaft E there is a spur-wheel, G, that gears into a crank, H, the latter being connected to a holding device or follower, I, moving up and down between the pillar-blocks D, and guided, in so doing, by guide-pieces *d* and recesses *e* in the follower that receives them. The object and purpose of this follower is to hold the sickle-section or other article to be tempered tight against the surface *a* of the die or block A, which is directly under it, and against the force of the tempering element coming in contact with the exposed parts of the section.

If other articles are to be tempered having a double cutting-edge, as in the cutting-edge of sickle-sections, then the surface *a* and the openings or passages *c* of the block or die A should be made to correspond to the form of the article to be tempered, so that only that portion which is to form the cutting-edges will be exposed to the action of the tempering-element, while the portion not to be tempered is shielded by the protecting-surface.

The sickle-sections, after having been properly heated, are taken out of the fire and the edges dipped in oil. They are then immediately placed upon the surface *a* of the die or block A, and the follower I brought down tight upon the sections, after which water is then let on, which strikes the exposed or projecting edges only of the section.

Having now described my invention, what I claim as new, and desire to secure by Letters Patent, is—

1. A block or die formed with or having an inner protecting-surface and outer openings or passages through the die or block, and leading to the sides of the protecting-surface, substantially as and for the purpose set forth.

2. A block or die having openings or passages through it, and a protecting or shielding surface extending to a plane above the plane of the outlet of said openings or passages, substantially as and for the purpose described.

3. The combination, with a block or die having an inner protecting or shielding surface and outer openings or passages through it, of a device for holding the article to be tempered upon the protecting or shielding surface during the process of tempering, for the purpose specified.

In testimony that I claim the above I have hereunto subscribed my name in the presence of two witnesses.

SAMUEL F. REYNOLDS.

Witnesses:

NELSON B. ELDRED,
CHARLES BEMIS.